Figure 1:
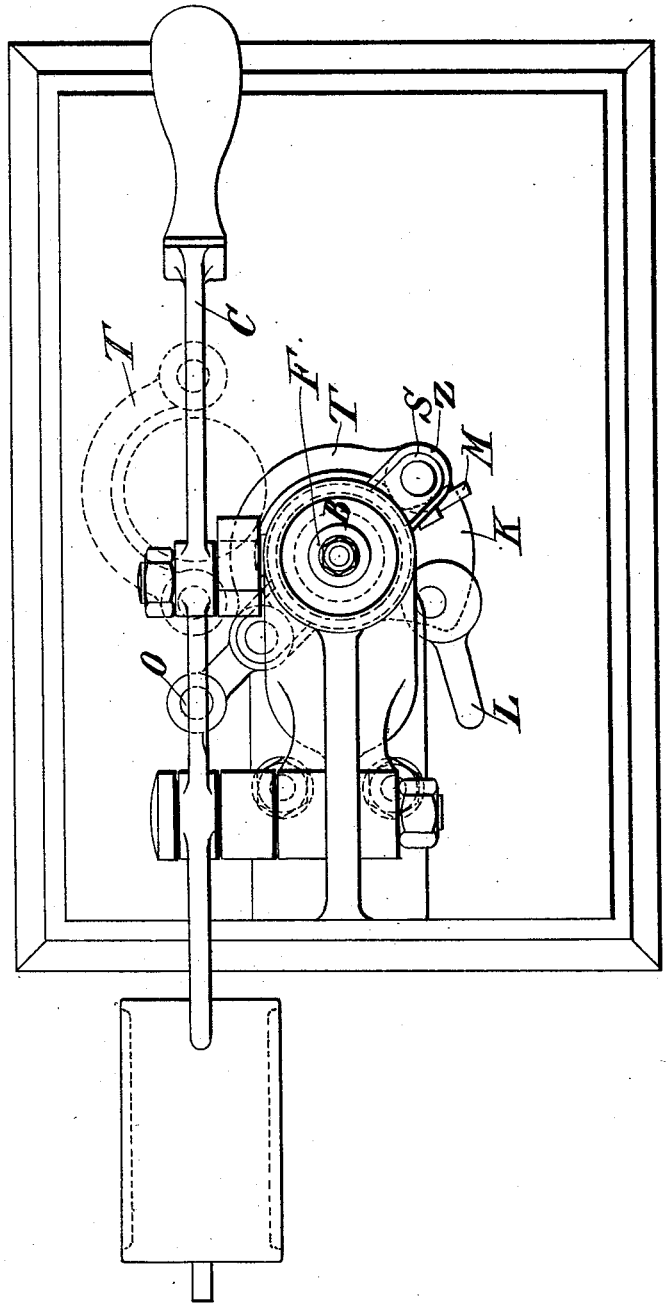

(No Model.) 3 Sheets—Sheet 1.

G. L. HILLE.
PROCESS OF AND APPARATUS FOR THE MANUFACTURE OF HOLLOW CAOUTCHOUC BALLS.

No. 482,088. Patented Sept. 6, 1892.

Witnesses:
George Barry.
C. E. Sundgren

Inventor.
Gustav Louis Hille.
by attorneys.
Brown & Seward (No Model.) 3 Sheets—Sheet 2.
G. L. HILLE.
PROCESS OF AND APPARATUS FOR THE MANUFACTURE OF HOLLOW CAOUTCHOUC BALLS.
No. 482,088. Patented Sept. 6, 1892.
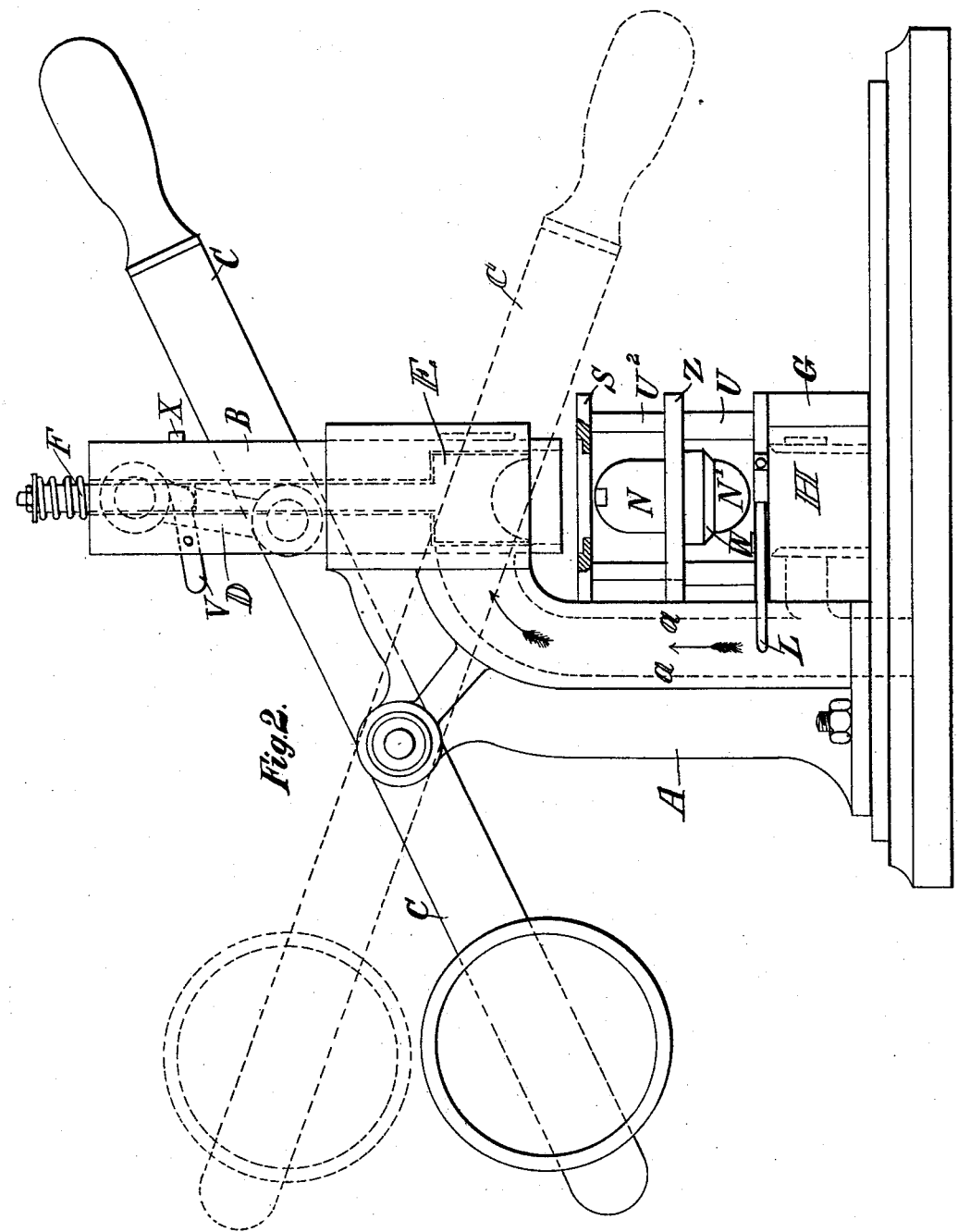
Witnesses:—
George Barry.
C. F. Sundgren
Inventor:—
Gustav Louis Hille
by attorneys
Brown & Seward (No Model.) 3 Sheets—Sheet 3.
G. L. HILLE.
PROCESS OF AND APPARATUS FOR THE MANUFACTURE OF HOLLOW CAOUTCHOUC BALLS.
No. 482,088. Patented Sept. 6, 1892.
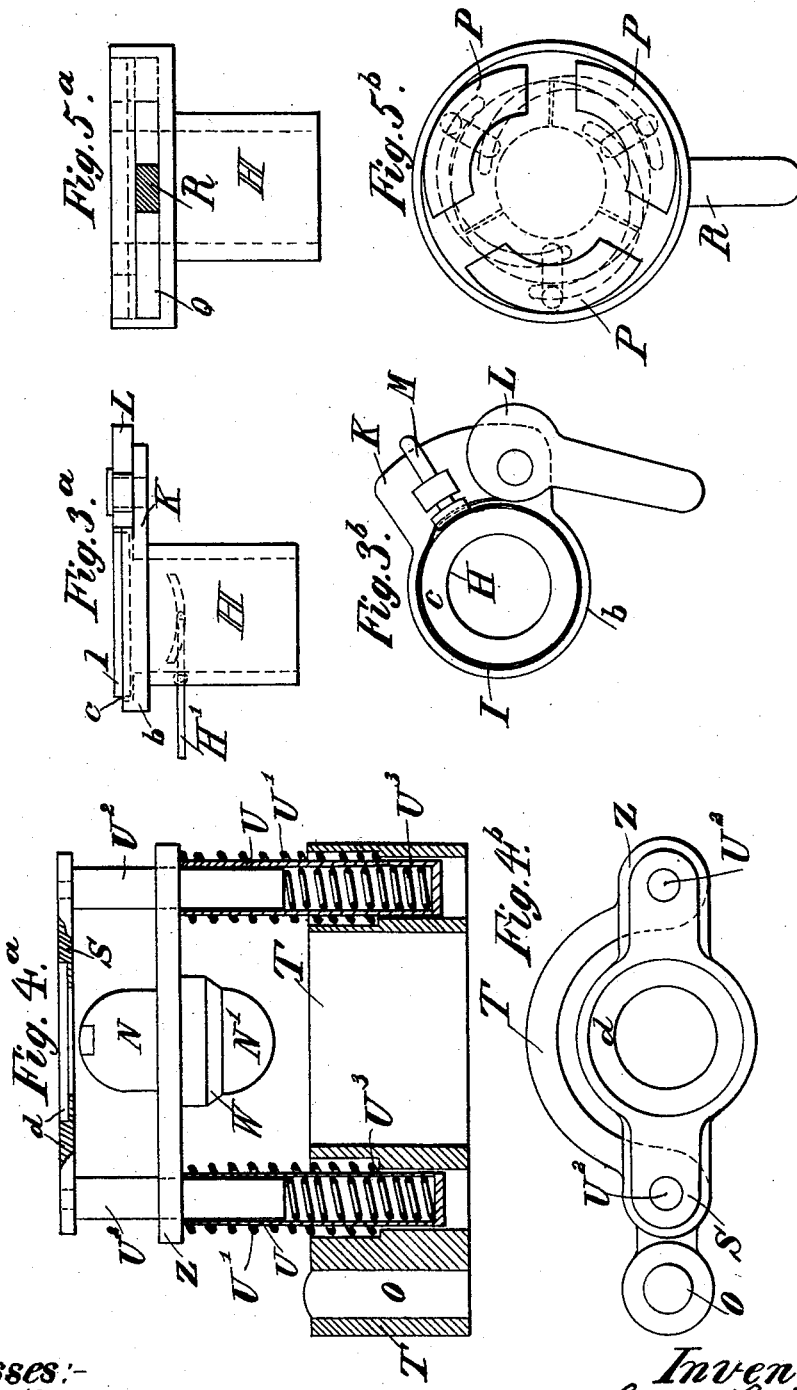
Witnesses:—
George Barry.
C. Sundgren.
Inventor.
Gustav Louis Hille
by attorneys
Brown & Seward

UNITED STATES PATENT OFFICE.

GUSTAV LOUIS HILLE, OF LONDON, ENGLAND.

PROCESS OF AND APPARATUS FOR THE MANUFACTURE OF HOLLOW CAOUTCHOUC BALLS.

SPECIFICATION forming part of Letters Patent No. 482,088, dated September 6, 1892.

Application filed April 22, 1892. Serial No. 430,172. (No model.)

*To all whom it may concern:*

Be it known that I, GUSTAV LOUIS HILLE, a subject of the Queen of England, and a resident of London, England, have invented new and useful Improvements in Processes of and Apparatus for the Manufacture of Hollow Caoutchouc Balls, of which the following is a specification.

The present invention relates to a process for producing hollow rubber balls as well as to an apparatus which suitably serves this purpose.

Hitherto rubber balls have commonly been made by hand, either of four oval pieces or of two pieces of substantially the form of the figure 8. An attempt has also been made to form rubber balls out of two hollow hemispheres, the edges of which were secured together by adhesive material; but this process was not found to answer, as the connection of the two halves of the ball was a very imperfect one, and the balls therefore very soon became useless.

According to the present process the balls are also composed of two hollow hemispheres; but the connection of the two halves of the ball is made in such manner that an overlapping seam is formed without any circumferential projection. For this purpose the one half of the ball while being formed is provided with a sharp projecting beveled edge, which when the two halves of the ball are pressed together laps well and closely over the edge of the other half and unites with it autogenously. In order to make the ball-joint air-tight, a flexible steel band is laid around the same for a short time or the two halves of the ball are pressed together in another manner until their connection has become completely air-tight. The balls made in this way are exceedingly durable.

For carrying out all the operations the apparatus hereinafter described, by means of which very much time and labor are saved, is advantageously used.

Figure 1 is a plan view of the apparatus. Fig. 2 is a side view of the same, partly in section. Figs. 3ª, 3ᵇ, 4ª, and 4ᵇ represent details of the apparatus—viz., Figs. 3ª and 3ᵇ, a side view and plan view of the contrivance by means of which a flexible steel band is laid around the ball, and Figs. 4ª and 4ᵇ a side view and plan view of that portion of the apparatus on which the halves of the ball are formed. Figs. 5ª and 5ᵇ show side view and plan view of another contrivance for joining the halves of the ball.

A is a standard, which is made hollow, as indicated by dotted lines *a a* in Fig. 2, so that heat from a gas-burner or a steam-pipe can be conducted through it to the portions of the apparatus which are brought into action in the forming of the halves of the ball and the heating of which contributes, essentially, toward facilitating the forming. The overhanging head of the said standard is bored out cylindrically to receive the piston B, which can be moved up and down by means of a weighted lever C. The connection between the piston and the lever is effected by a rod D. The piston B is bored centrally and counterbored at its lower end to a caliber corresponding to the diameter of the ball to be formed, and in the said central bore there is placed an ejector E, the lower portion of which is hollowed out spherically to form a socket and which is held in its normal position by a spiral spring F, Fig. 2, above the piston B. The said ejector can, however, be pressed downward by means of a lever V, resting in a vertical slit in the side of the piston, and this occurs when the outer arm of the lever V comes in contact with the standard A during the downward movement of the piston B. The counterbore in the piston B and the socket in the ejector combine to form an upper outer hemispherical die. In one side of the piston B is placed a stop-pin X, Fig. 2, by which the downward movement of the piston is limited.

At the foot of the standard is arranged a block G, which is bored out in a line with the bore in the overhanging head of the standard. In this bore of the block G a socket H is fitted, the inside caliber of which corresponds to the diameter of the ball to be manufactured and which forms a lower outer hemispherical die for the same. At its upper end this socket or die H is provided with a flange *b*, in which, concentric with the said socket or die, a space is formed for the reception of a steel clamping-band I and of one of the two rubber disks of which the ball is to be formed. (See Figs. 3ª and 3ᵇ.)

For the operation of the steel band I the following provision has been made: The flange *b* of the socket or die H has on one side an extension K, and on this extension an eccentric lever L is pivoted, Fig 3ᵇ. One end of the steel band I is firmly connected with the eccentric of said lever. The other end of the band is fastened to a radially-sliding bolt M. Now if the lever L is turned, then, first of all, the bolt M is displaced toward the center of the die H. The same hereupon lies against the projecting edge of the lower half of the ball. Then the band I is drawn tight. This contrivance may of course be replaced by another one with the same effect. Thus with equal advantage, for instance, (see Figs. 5ᵃ and 5ᵇ,) sliding blocks P can be employed, the inner curve of which corresponds to the curve of the surface of the ball and which when they are pressed tightly against and clamped around the ball form a connected ring through which the joint between the halves of the ball is closed air-tight. The simultaneous displacement of the sliding blocks P is effected by means of a disk Q, provided with eccentric slits, and which is turned by means of a handle R. It is simpler, however, to thrust the ball by means of the piston B into a tube suitably arranged on the block G, and the sides of which then tightly inclose and clamp the ball-joint so that the same is rendered completely air-tight.

Between the piston B and the lower outer die H the "former" is detachably affixed. This former consists, essentially, of two pieces N N′ of semi-spherical form, of which the one is affixed above and the other below a cross-head Z, Fig. 4ᵃ. On these two pieces N N′ the rubber disks are given their form of hollow hemispheres. The lower piece N′ has a conical extension W, which serves for forming the sharp beveled edge with which the lower half of the ball is to be provided. The cross-head Z rests on two upright tubular sockets U, which are fitted to move up and down in vertical guides in a yoke or carrier T, which is capable of swinging horizontally about a fixed pivot O, so that the whole former can thus be displaced laterally out of its position.

The tubular sockets U are surrounded by spiral springs U′, which rest in recesses in the guides in the yoke T and which tend to press the cross-head Z upward. In the tubular sockets are fitted upright rods or bolts U², which are held up by spiral springs U³ within the sockets U. These bolts U² carry a second cross-head S, which is provided with a central aperture, around which is a recess *d* for receiving one of the rubber disks to be formed, Fig. 4ᵃ.

Now in making a rubber ball by means of the hereinbefore-described apparatus I proceed as follows: Two rubber disks are taken, and of these one is laid into the recess *d* of the cross-head S and the other onto the socket H. Then the lever C is pressed down, taking with it the piston B. During the downward movement of the piston the upper rubber disk first of all is pressed by means of the former N into the cavities in the piston B and the socket of the ejector E. The former is then itself taken along downward, the form-piece N′ pressing the lower rubber disk into the socket H. In this manner both halves of the ball are formed at one stroke. When the piston is returned to its original position, then the former is also brought into its former position again by means of the springs U′ U′. The halves of the ball remain, respectively, in the socket of the ejector and in the socket H. The carrier T, with the former, is now turned aside and the piston B is then pressed down for the second time. The two halves of the ball are thus made to approach each other; but before they have been brought completely together a suitable cement may be spread on the projecting edge of the lower half-ball. As the bottom of the piston approaches the socket H, the small lever V comes in contact with the head of the standard, and the ejector E is thereby set in operation to press the upper half-ball out of the piston and into the projecting edge of the lower half-ball. On the steel band I or the blocks P being now drawn tight the projecting edge of the lower half-ball is contracted and pressed tightly around the side of the upper half-ball, so that an air-tight closure is effected by autogenous union of the adjacent parts. After some time the finished ball can be taken out of the apparatus. A double-armed lever H′, adjusted revolubly in a slit in the side of the socket H, Fig. 3ᵃ, is used for removing the finished ball out of the apparatus. In this manner exceedingly durable balls can be made quickly and at slight cost. The vulcanizing may be done in the same manner as with the balls made by hand.

What I claim as my invention, and desire to secure by Letters Patent, is—

1. The process of making hollow rubber balls with overlapping seam, consisting in first forming two rubber disks into hollow hemispheres, of which one has a projecting beveled edge, next placing the said hemispheres together, with the said projecting edge of the one overlapping the edge of the other, and finally contracting and compressing the said projecting and overlapping edge around the other hemisphere to produce the autogenous union of the two halves, substantially as and for the purpose set forth.

2. The combination, with a stationary outer die, an outer die movable toward and from said stationary outer die, a support for said stationary die, a standard containing a guide for said movable die, and means of heating said support and standard, of an inner former comprising two hemispherical form-pieces, a carrier for said inner former movable laterally toward and from a position between said stationary and movable outer dies, and a clamping device interposed between said stationary and movable outer dies, substantially as herein set forth.

3. The combination, with the bed G, the stationary die H, the standard A, and the piston B and ejector E, constituting a movable die, of the laterally-movable carrier T, the cross-head Z, with its attached form-pieces N N', and sockets U, fitted to guides in said carrier, the disk supporting cross-head S and its guide-rods $U^2$, fitted to said sockets U, and the springs $U'$ and $U^3$, applied, respectively, to said cross-head Z and rods $U^2$, all substantially as and for the purpose herein set forth.

In testimony whereof I have signed my name to this specification in the presence of two subscribing witnesses.

GUSTAV LOUIS HILLE.

Witnesses:
PERCY P. TRISTRAM,
HUBERT JEFFERYS.